(12) United States Patent
Guttenberger et al.

(10) Patent No.: US 6,419,368 B1
(45) Date of Patent: Jul. 16, 2002

(54) ACTUATING MECHANISM FOR DRIVING A MOTOR VEHICLE REARVIEW MIRROR

(75) Inventors: Richard Guttenberger, Grading; Werner Seichter, Goorgonsmünd, both of (DE)

(73) Assignee: Bühler Motor GmbH, Nürnberg (DE)

( * ) Notice: Subject to any disclaimer, the term of this patent is extended or adjusted under 35 U.S.C. 154(b) by 0 days.

(21) Appl. No.: 09/691,094

(22) Filed: Oct. 19, 2000

(30) Foreign Application Priority Data

Oct. 19, 1999 (DE) ......................................... 199 50 189

(51) Int. Cl.[7] .............................................. G02B 7/182
(52) U.S. Cl. ...................... 359/872; 359/873; 359/874; 359/876; 359/877; 439/449; 439/467
(58) Field of Search ................................. 359/872, 873, 359/874, 876; 439/499, 460, 465, 967

(56) References Cited

U.S. PATENT DOCUMENTS

| | | | | |
|---|---|---|---|---|
| 3,057,001 A | * | 10/1962 | Rapata | 439/467 |
| 3,123,662 A | * | 3/1964 | Fink | 439/467 |
| 3,749,818 A | * | 7/1973 | Jemison | 174/65 |
| 3,826,935 A | * | 7/1974 | Grierson et al. | 310/71 |
| 4,701,037 A | * | 10/1987 | Bramer | 359/877 |
| 5,008,574 A | * | 4/1991 | Kitahata | 310/68 D |
| 6,244,714 B1 | | 6/2001 | Mertens | |

FOREIGN PATENT DOCUMENTS

| | | |
|---|---|---|
| DE | 199 12 755 | 9/1999 |
| DE | 198 13 039 | 10/1999 |

* cited by examiner

*Primary Examiner*—Mohammad Sikder
(74) *Attorney, Agent, or Firm*—Jacobson Holman, PLLC

(57) ABSTRACT

An actuating mechanism, in particular for driving a motor vehicle rearview mirror. The actuating mechanism includes a housing, at least one electric motor, which is arranged therein and whose output shaft is drive-coupled to a reducing gear, driving an actuating mechanism, and a plug shaft, which is designed as one piece with the housing and into which a connecting plug can be plugged. Different types of contacting are possible with a housing shape and there is always the guarantee of a strain relief for the supply and/or control lines. Additional relief strain devices, which are not one piece with the housing and which can be plugged into the plug shaft and locked with the housing and which can accommodate at least two supply and/or control lines in one area, are at a distance from the line ends and holds the line ends so as to resist tension.

18 Claims, 3 Drawing Sheets

Schnitt B-B

ACTUATING MECHANISM FOR DRIVING A MOTOR VEHICLE REARVIEW MIRROR

FIELD OF THE INVENTION

The invention relates to an actuating mechanism, in particular for driving a motor vehicle rearview mirror. The actuating mechanism includes a housing, at least one electric motor, which is arranged therein and whose output shaft is drive-coupled to a reducing gear, driving an actuating mechanism, and a plug shaft, which is designed as one piece with the housing and into which a connecting plug can be plugged.

BACKGROUND OF THE INVENTION

There already exists an actuating mechanism with a housing, two electric motors, whose output shafts are drive-coupled to a reducing gear, driving a mirror, and a plug shaft, which is designed as one piece with the housing and into which a connecting plug can be plugged. In the prior art actuating mechanism, the motors are connected to the plug shaft by means of sheet metal guides and form the counter plug to the connecting plug, which can be plugged into the plug shaft and locked with the housing. The prior art actuating mechanism exhibits the drawback that it cannot be installed on the electric motors or other electric or electronic components without modifying the housing for other types of contacting, like direct soldering of supply and/or control lines, especially when the supply and/or control lines are to be provided with a strain relief.

SUMMARY OF THE INVENTION

Therefore, the object of the present invention is to provide for this class of actuating mechanism the possibility that different types of contacting are possible with a housing shape and yet there is always the guarantee of a strain relief for the supply and/or control lines.

This problem is solved, according to the invention, by additional relief strain means, which are not one piece with the housing and which can be plugged into the plug shaft and locked with the housing and accommodate at least two supply and/or control lines in one area, which is at a distance from the line ends and holds so as to resist tension. Thus, the supply and/or control lines can be accommodated in an area that is at a distance from the line ends and are held with strain relief, whereas the strain relief means lock with the housing and thus are held firmly in position. In another application, the plug shaft can be used again as the counter plug without having to make any changes to the housing.

The strain relief means can be made of one single piece, if it is made of two holding members, which are connected together as one piece by means of at least one film hinge or a pressure relief joint.

Preferably two spaced film hinges are used that define a passage. This passage is suitable for accommodating the supply and/or control lines. Expediently the two holding members are designed in such a manner that they can be locked together. Thus, the supply and/or control lines are held reliably. The locking mechanism comprises preferably recesses and projecting pins, which are equipped with locking means. In this respect the pins are guided into the recesses and snapped in there.

The holding members are provided with line receptacles and these with clamping edges. They serve to hold the lines tight before the two holding members are locked together.

In addition, the clamping edges, which are arranged transversely to the course of the line, guarantee the supply and/or control lines against tensile forces and hold them so in their position.

An especially good strain relief effect is achieved in that the at least one projecting pin engages between two supply and/or control lines and pushes them against additional clamping edges in the holding member.

The assembly is facilitated in that guides, comprising projecting and return areas, are provided between the two holding members, which serve as joining and adjusting means.

Since the strain relief means are designed externally like a corresponding plug, which can be plugged into the plug shaft, the housing, with which the plug shaft is one piece, can be used unmodified for different types of contacting. Since the strain relief means can be locked with locking hooks of the housing, the supply and or control lines are held reliably.

To hold the strain relief means without clearance, there are additional stop means, which limit the insertion depth in the plug shaft.

The strain relief means are advantageous, especially when the ends of the supply and/or control lines are soldered or welded to at least one electric motor. Thus, the solder or weld joints are not exposed to any tensile forces, which would endanger the contact reliability.

BRIEF DESCRIPTION OF THE DRAWINGS

One embodiment of the invention is explained in detail in the following with reference to the drawings.

FIG. 2b is a sectional view of the strain relief means in the locked state taken along line B—B of FIG. 2a.

DETAILED DESCRIPTION OF THE PREFERRED EMBODIMENTS

Figure 1:
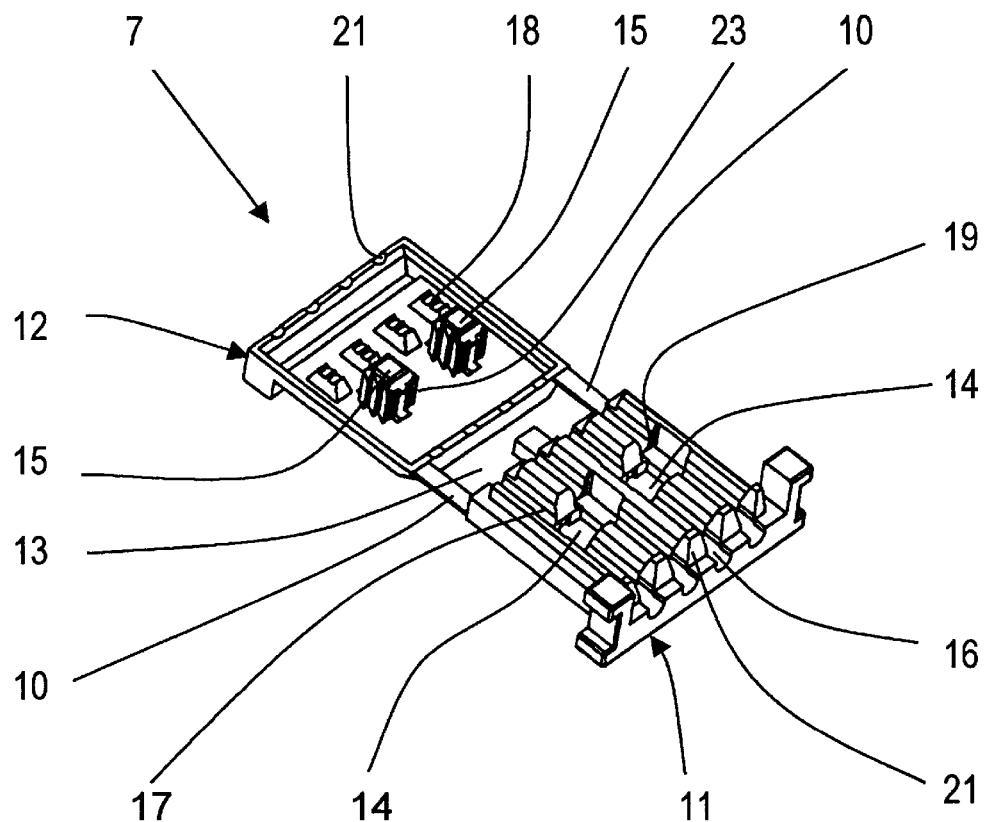
FIG. 1 depicts the strain relief means in the preassembled state.

FIG. 1 shows the strain relief means 7 in a preassembled state, where two holding members 11 and 12, which are connected together by means of two film hinges 10, are depicted in an open state, with a passage 13 for accommodating supply and/or control lines, which can be laid with clamping edges 17 in line receptacles 16, recesses 14 and pins 15, which are provided with clamping edges 23 and which can mesh and can be locked together, clamping edges 18, which are aligned transversely to the direction of the line length, clamping edges 19, against which the supply and/or control lines can be forced in the assembled state, and guides 21, which serve as the joining aids.

Figure 2A:
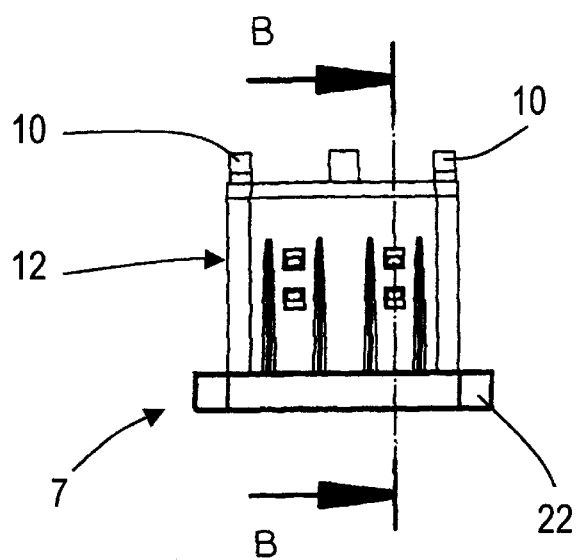
FIG. 2a depicts the strain relief means in a locked state.
Figure 2B:
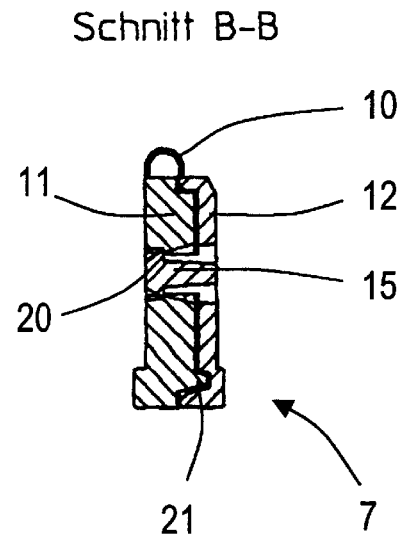

FIG. 2a shows the strain relief means 7, with the holding members 11 and 12 in the locked state, with the film hinges and with stop means 22, which limit the insertion depth into a plug shaft. FIG. 2b is a sectional view of the locking means 20, which are located at the recesses 14 and the pins 15, the film hinges 10 and the guides 21.

Figure 3:
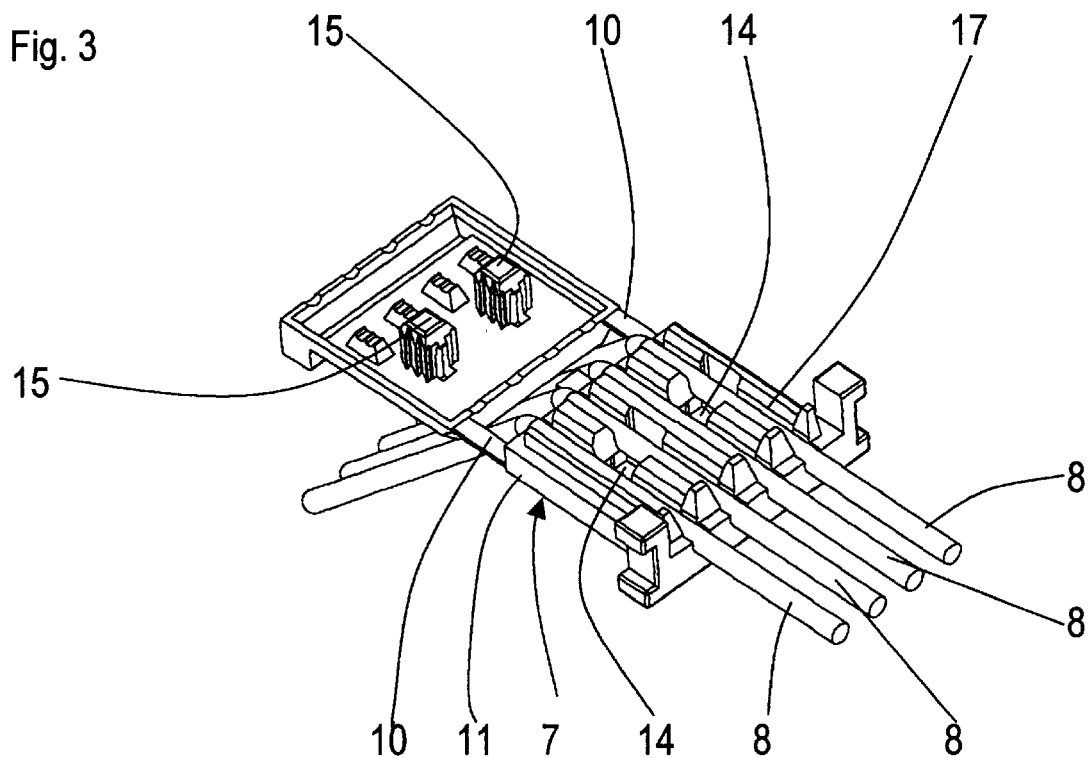
FIG. 3 depicts the strain relief means after a first assembly step.

FIG. 3 depicts the strain relief means 7 after the first assembly step. There the supply and/or control lines 8 are inserted into the holding member 11 and are already held to such an extent by the clamping edges 17 that a reliable assembly is possible. In FIG. 3 the recesses 14, the pins 15 and the film hinges 10 are apparent.

Figure 4:
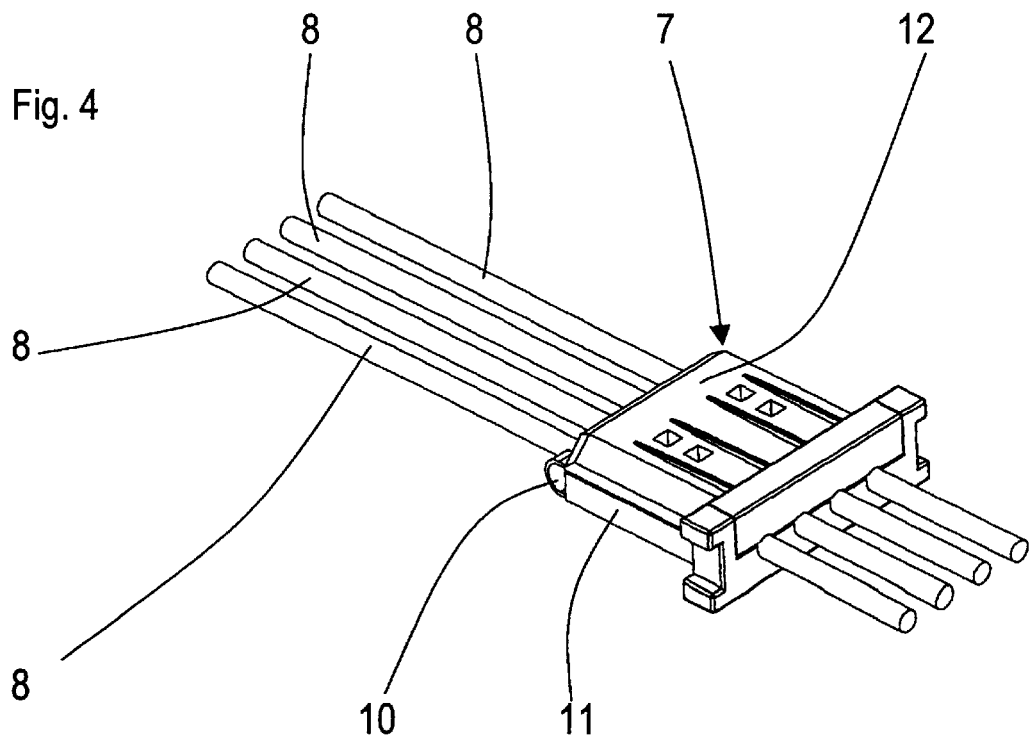
FIG. 4 depicts the strain relief means after a second assembly step.

FIG. 4 depicts the state of the strain relief means 7 after another assembly step. Here the two holding members 11 and 12 are locked together and hold thus the supply and/or the control lines reliably.

Figure 5:
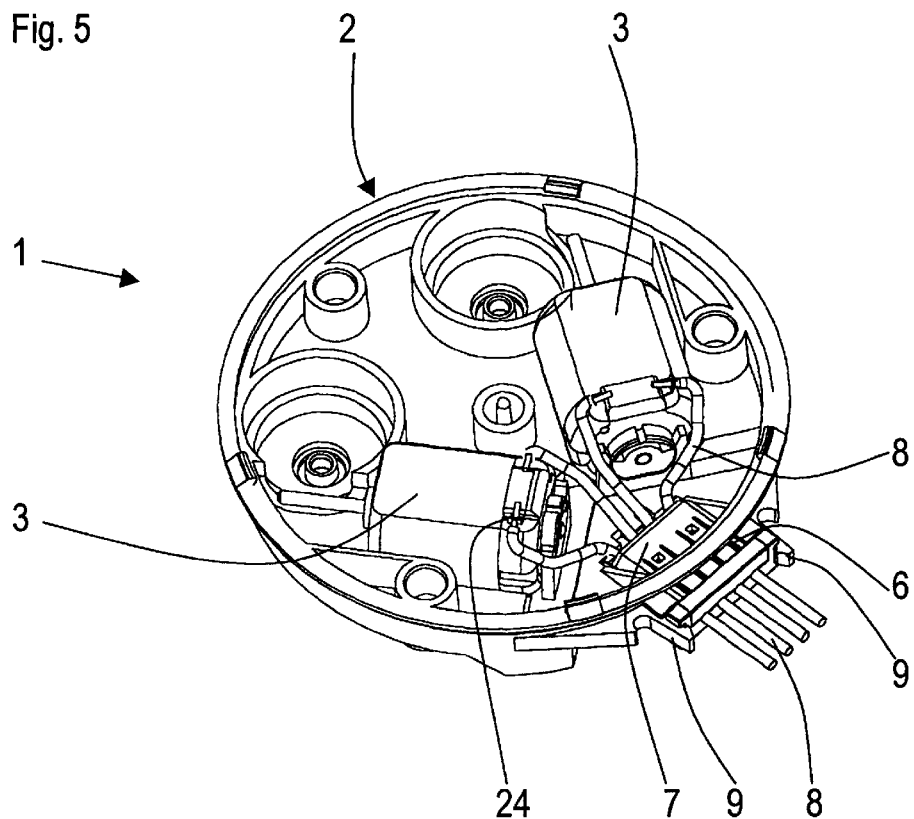
FIG. 5 depicts the strain relief means in the installed state.

FIG. 5 depicts a part of an actuating mechanism 1 with a housing member 2, which accommodates electric motors 3, whose output shafts engage with one (only one indicated) reducing gear, the plug shaft 6, the supply and/or the control lines 8, which are connected electrically to the electric motors 3 at solder joints 24, the strain relief means 7, which hold reliably the snap hooks 9 of the housing 2.

Figure 6:
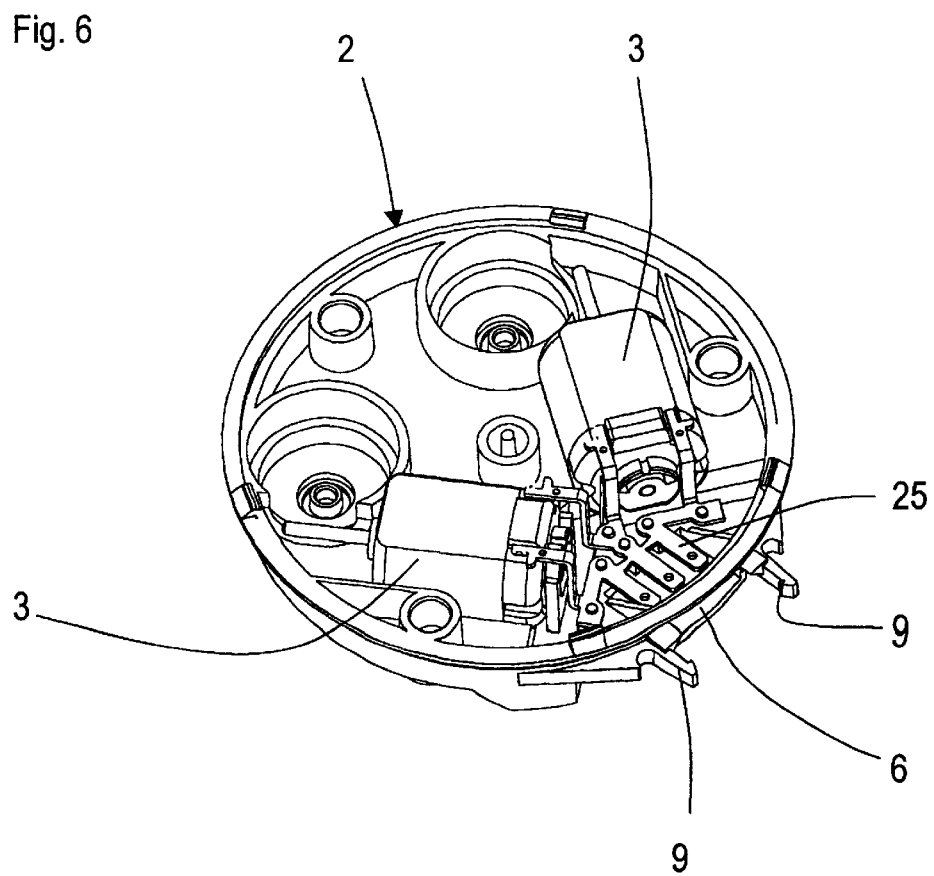
FIG. 6 depicts a prior art actuating mechanism with sheet metal guides.

FIG. 6 depicts a conventional actuating member, whose electric motors 3 are contacted over sheet metal guides 25, which serve as plug tongues. In this respect the housing with the plug shaft 6 and the snap hooks 9 does not differ from the housing shown in FIG. 5, so that the housing does not have to be modified for the two different contacting methods.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. Actuating mechanism for driving a motor vehicle rearview mirror, said actuating mechanism comprising
    a motor housing having a plug opening integral with said motor housing for receipt of supply lines,
    at least one electric motor arranged in said motor a housing, an output shaft of said at least one electric motor being drive-coupled to a reducing gear for driving an actuating mechanism to move a motor vehicle rearview mirror located externally of the motor housing, and
    a plug having strain relief means separate from the motor housing for plugging the plug into the plug opening of the motor housing and the strain relief means locks in the motor housing and for accommodating at least two supply lines passing through the strain relief means into the motor housing, with the strain relief means being spaced at a distance from ends of the at least two supply lines and holding the at least two supply lines so as to resist tension.

2. Actuating mechanism as claimed in claim 1, wherein the strain relief means includes two holding members connected together as one piece by at least one film hinge.

3. Actuating mechanism as claimed in claim 2, wherein between the two holding members there is a passage defined by two film hinges.

4. Actuating mechanism as claimed in claim 3, wherein the passage accommodates the supply lines.

5. Actuating mechanism as claimed in claim 2, wherein the two holding members are locked together.

6. Actuating mechanism as claimed in claim 2, wherein one of the two holding members include at least one recess.

7. Actuating mechanism as claimed in claim 6, wherein the other of the two holding members includes at least one projecting pin.

8. Actuating mechanism as claimed in claim 6, wherein in an area of the at least one recess, the two holding members include locking means for locking the two holding members together.

9. Actuating mechanism as claimed in claim 2, wherein one of the two holding members is provided with line receptacles with clamping edges to hold the supply lines.

10. Actuating mechanism as claimed in claim 9, wherein the other of the two holding members is provided with clamping edges to hold the supply lines in their position against tensile forces.

11. Actuating mechanism as claimed in claim 7, wherein the at least one projecting pin exhibits clamping edges arranged transversely to a course of the supply lines.

12. Actuating mechanism as claimed in claim 11, wherein said at least one projecting pin engages between two supply lines and pushes the two supply lines against additional clamping edges in one of the two holding members.

13. Actuating mechanism as claimed in claim 2, further comprising guides having projecting and return areas between the two holding members and serving as joining and adjusting means.

14. Actuating mechanism as claimed in claim 2, wherein the two holding members include several clamps.

15. Actuating mechanism as claimed in claim 1, wherein the strain relief means is locked with the housing.

16. Actuating mechanism as claimed in claim 1, wherein the strain relief means include stop means for limiting an insertion depth of the strain relief means in the plug opening.

17. Actuating mechanism as claimed in claim 1, wherein the ends of the supply lines are soldered to the at least one electric motor.

18. Actuating mechanism as claimed in claim 1, wherein there are at least three supply lines.

* * * * *